(12) United States Patent
Kang

(10) Patent No.: US 8,210,099 B2
(45) Date of Patent: Jul. 3, 2012

(54) BABY FORMULA MAKER

(76) Inventor: Mi Seon Kang, Songpa-gu (KR)

( * ) Notice: Subject to any disclaimer, the term of this patent is extended or adjusted under 35 U.S.C. 154(b) by 338 days.

(21) Appl. No.: 12/607,109

(22) Filed: Oct. 28, 2009

(65) Prior Publication Data

US 2010/0326285 A1 Dec. 30, 2010

(30) Foreign Application Priority Data

Jun. 24, 2009 (KR) .................. 10-2009-0056681

(51) Int. Cl.
*A47J 31/00* (2006.01)
(52) U.S. Cl. ............. 99/323.3; 99/275; 99/280; 99/283; 99/300; 222/146.1
(58) Field of Classification Search ............ 99/280, 99/281, 300, 304, 306, 307, 275, 323.3, 283; 222/146.1
See application file for complete search history.

(56) References Cited

U.S. PATENT DOCUMENTS

| | | | | |
|---|---|---|---|---|
| 5,570,816 A | * | 11/1996 | LaBarbera, Jr. | 222/129.4 |
| 6,173,117 B1 | * | 1/2001 | Clubb | 392/442 |
| 6,640,818 B1 | * | 11/2003 | Talisman | 134/89 |
| 7,316,249 B2 | | 1/2008 | Cheong | |
| 2007/0034084 A1 | * | 2/2007 | Shertok et al. | 99/279 |
| 2009/0151574 A1 | * | 6/2009 | Nijboer et al. | 99/282 |
| 2009/0188394 A1 | * | 7/2009 | Sinnema et al. | 99/287 |
| 2010/0112152 A1 | * | 5/2010 | Sinnema et al. | 426/248 |

FOREIGN PATENT DOCUMENTS

KR 10-2004-0105720 12/2004

* cited by examiner

*Primary Examiner* — Reginald L Alexander
(74) *Attorney, Agent, or Firm* — Sherr & Vaughn, PLLC

(57) ABSTRACT

A baby formula maker including: a main body in which a water tub and a baby formula tub are installed; a heating portion installed in the main body and heating water contained in the water tub; a time controller controlling time at which the water is heated by the heating portion; a cooling portion including a radiator cooling the water heated by the heating portion and one or a plurality of Peltier cooling modules attached to the radiator so as to lower the temperature of the radiator; and a electric current controller controlling temperatures of the one or the plurality of Peltier cooling modules. The time required to make milk for nursing can be remarkably reduced, and if milk for nursing is needed, immediate nursing can be carried out, and speed and convenience can be provided to the user, and the baby formula maker is sanitary and compact and has a simple structure and thus can be economically manufactured on a mass scale.

9 Claims, 2 Drawing Sheets

BABY FORMULA MAKER

CROSS-REFERENCE TO RELATED PATENT APPLICATIONS

This application claims the benefit of Korean Patent Application No. 10-2009-0056681, filed on Jun. 24, 2009, in the Korean Intellectual Property Office, the disclosure of which is incorporated herein in its entirety by reference.

BACKGROUND OF THE INVENTION

1. Field of the Invention

The present invention relates to a baby formula maker, and more particularly, to a baby formula maker that makes milk for nursing.

2. Description of the Related Art

Generally, newborn babies are nursed for a predetermined time period after birth. In this case, newborn babies are breast-fed and are usually nursed with milk made by mixing baby formula and warm water. In order to make milk by mixing baby formula and warm water, water has to be boiled and then has to be cooled to be at an appropriate temperature for nursing, and the amount of baby formula has to be measured by using a spoon and then, warm water and baby formula have to be put in a nursing bottle and then have to be shaken to be mixed with each other.

However, considering newborn babies have to be nursed several times a day, it is very inconvenient to repeat making baby formula for nursing, and in particular, water has to be boiled and then, has to be cooled to be at an appropriate temperature for nursing. Thus, it takes time to boil and cool water, and newborn babies may be hastily nursed.

SUMMARY OF THE INVENTION

The present invention provides a baby formula maker having an improved structure in which time required to make milk for nursing is remarkably reduced, and if milk for nursing is needed, immediate nursing is carried out and milk is simply made without any special manipulation so that sanitary and economical baby formula maker can be conveniently provided.

According to an aspect of the present invention, there is provided a baby formula maker including: a main body in which a water tub and a baby formula tub are installed; a heating portion installed in the main body and heating water contained in the water tub; a time controller controlling the length of time the water is heated by the heating portion; a cooling portion including a radiator cooling the water heated by the heating portion and one or a plurality of Peltier cooling modules attached to the radiator so as to lower the temperature of the radiator; and a electric current controller controlling temperatures of the one or the plurality of Peltier cooling modules.

The water tub may be formed of stainless steel. The water tub or the baby formula tub may be formed of a transparent material so that an amount of the water that remains in the water tub or the baby formula that remains in the baby formula tub can be checked from the outside. The baby formula tub may include a baby formula discharge switch which will discharge a predetermined amount of the baby formula by the user's manipulation.

The time controller may be connected to an opening and closing portion disposed in the water tub, and if the water contained in the water tub is heated by the heating portion to reach a predetermined temperature, the time controller may allow the opening and closing portion to open and may allow the water to be supplied to the cooling portion. The radiator may be an aluminum pipe or a silicon tube. The one or the plurality of Peltier cooling modules may include a heat dissipating plate disposed outside the one or the plurality of Peltier cooling modules. The heating portion may be a nichrome heating coil.

BRIEF DESCRIPTION OF THE DRAWINGS

The above and other features and advantages of the present invention will become more apparent by describing in detail the exemplary embodiments thereof with reference to the attached drawings in which.

DETAILED DESCRIPTION OF THE INVENTION

The present invention will now be described more fully with reference to the accompanying drawings, in which the exemplary embodiments of the invention are shown.

Figure 1:
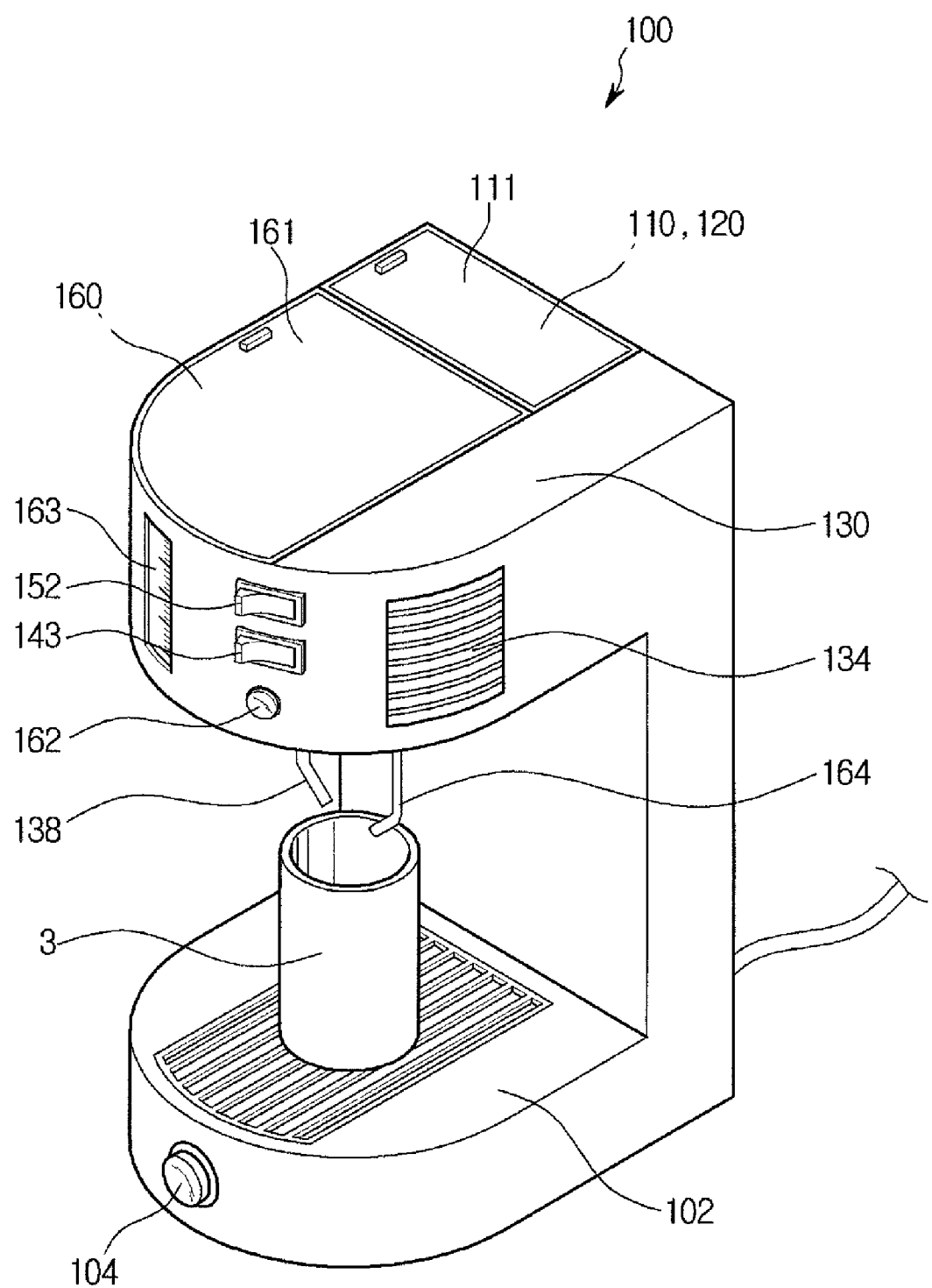
FIG. 1 is a perspective view of a baby formula maker according to an embodiment of the present invention.
Figure 2:
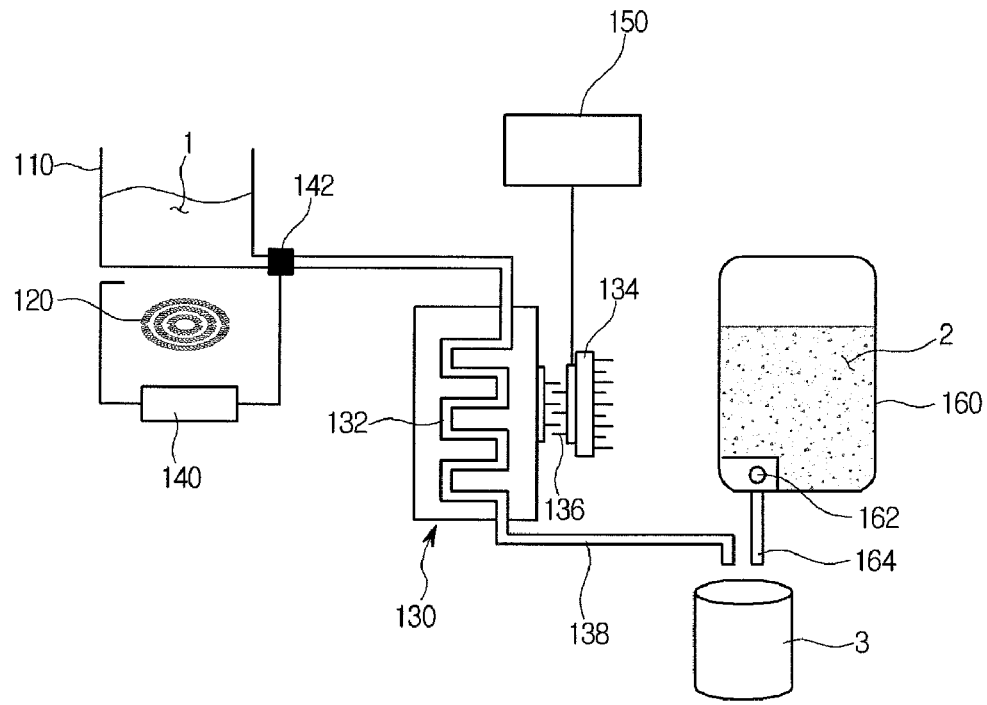
FIG. 2 illustrates a structure of the baby formula maker of FIG. 1.

FIG. 1 is a perspective view of a baby formula maker according to an embodiment of the present invention, and FIG. 2 illustrates a structure of the baby formula maker of FIG. 1.

Referring to FIGS. 1 and 2, the baby formula maker according to the electric current embodiment of the present invention includes a main body 100, a heating portion 120, a time controller 140, a cooling portion 130, and a electric current controller 150. A water tub 110 in which water 1 is contained, and a baby formula tub 160 in which baby formula 2 is contained, are installed in the main body 100. Furthermore, the heating portion 120, the time controller 140, the cooling portion 130, and the electric current controller 150 are compactly installed in the main body 100. Thus, a volume of the baby formula maker of FIGS. 1 and 2 is not large and thus may be easily installed even in a narrow space.

The baby formula tub 160 and the water tub 110 may supply the baby formula 2 and the water 1 to the baby formula tub 160 and the water tub 110 via covers 111 and 161 disposed on a top surface of the main body 100, respectively. Here, the baby formula tub 160 may be formed of a semi-transparent material, and a portion of the baby formula tub 160 may be exposed from the main body 100 so that the amount of the baby formula 2 that remains in the baby formula tub 160 may be checked from the outside. Also, a scale mark 163 may be displayed on the baby formula tub 160 so that a user may see the amount of the remaining baby formula 2.

The baby formula tub 160 may include a baby formula discharge switch 162 for discharging a predetermined amount of the baby formula 2 by the user's manipulation. The baby formula discharge switch 162 is exposed to the outside of the main body 100 so that the user may easily manipulate the baby formula discharge switch 162 even from the outside.

The water tub 110 may be easily accessed for cleaning and thus is sanitary. The water tub 110 may be formed of stainless steel so as to be rapidly heated by the heating portion 120 that will be described later. The capacity of the water tub 110 may be a small capacity of 300 ml, wherein the water 1 may be rapidly heated within 30 seconds and the size of the baby formula maker may be reduced.

The heating portion 120 is installed in the main body 100 and heats the water 1 contained in the water tub 110. A nichrome heating coil may be applied to the heating portion 120 so that high-speed heating may be performed. As such, in the electric current embodiment, the water 1 may be rapidly heated by the heating portion 120 to which the nichrome heating coil is applied, up to 100° C. for 10 seconds or 30 seconds.

The time controller 140 controls turn on/off of the heating portion 120 and heating time so that the water 1 may be sufficiently sterilized. Also, the time controller 140 is connected to an opening and closing portion 142 disposed in the water tub 110, and if the water 1 contained in the water tub 110 is heated by the heating portion 120 to reach a predetermined temperature, the time controller 140 allows the opening and closing portion 142 to open and allows the water 1 to be supplied to the cooling portion 130. The time controller 140 may be optionally operated by the user via a heating time selection switch 143 disposed in the main body 100, and the heating time may be designated as 30 seconds or 3 minutes at 100° C. However, the heating time may be changed according to the amount of the water 1, etc.

The cooling portion 130 cools the water 1 heated by the heating portion 120 and supplied via the opening and closing portion 142 to be at an appropriate temperate for nursing. The cooling portion 130 includes a radiator 132 for dissipating heat and a Peltier cooling module 136. The radiator 132 may be formed of aluminum having a good heat transfer property. The radiator 132 may be 'ㄹ'-shaped so that an area in which the radiator 132 contacts the outside may be increased and cooling efficiency may be improved. The Peltier cooling module 136 is attached to one side of the radiator 132 and lowers the temperature of the radiator 132. The Peltier cooling module 136 may be a PN diode thermo-electric Peltier module. A heat dissipating plate 134 may be disposed outside the Peltier cooling module 136 so that cooling efficiency may be improved.

As described above, the baby formula maker of FIGS. 1 and 2 may rapidly cool the water 1 heated by the heating portion 120 to be at an appropriate temperature for nursing due to the radiator 132 and the Peltier cooling module 136 so that time required to make milk for nursing may be significantly reduced.

The electric current controller 150 controls the temperature of the Peltier cooling module 136 according to the amount of electric current. The user may operate the electric current controller 150 optionally by using a high temperature/low temperature switch 152 disposed on the main body 100. In detail, the electric current controller 150 controls the temperature of the Peltier cooling module 136 by 0.5° C. according to the amount of electric current, wherein the temperature of the water 1 discharged via the cooling portion 130 is a high temperature (about 70° C.) or a low temperature (about 38° C.).

A baby formula outlet 164 through which the baby formula 2 is discharged from the baby formula tub 160, and a water outlet 138 through which the water 1 is discharged from the water tub 110, are disposed in the main body 100. Also, the main body 100 may include a prop portion 102 on which a milk bottle 3 is put, and a power switch 104. However, the present invention is not limited thereto, and various electrical elements such as a lamp, a thermometer, etc. may be installed in the main body 100 in consideration of user's convenience. Also, the structure of the main body 100 may be changed, and this is a general matter and thus will be omitted. Furthermore, exterior decor or other configurations including the structure and shape of the main body 100 other than main elements of the baby formula maker of FIGS. 1 and 2 may be changed in various ways according to a user's design and the capacity of the water tub 110 without departing from the objective of the present invention.

Figure 3:
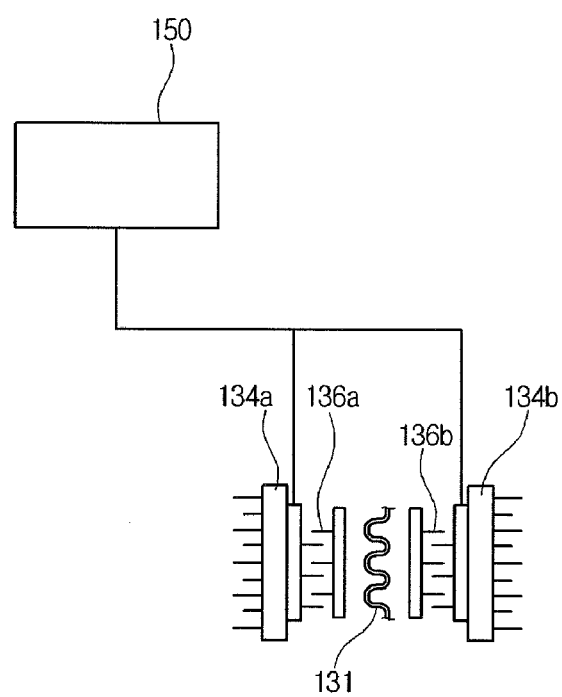
FIG. 3 is a view of a cooling portion of the baby formula maker of FIG. 1, according to an embodiment of the present invention.

FIG. 3 is a view of the cooling portion 130 of the baby formula maker of FIG. 1, according to an embodiment of the present invention. Referring to FIG. 3, a radiator 131 according to the present embodiment may be a silicon tube. The silicon tube is a sanitary tool such as a pacifier for nursing and is formed of a thermostable material that withstands even at a high temperature (about 100° C.) of the heated water.

Also, the silicon tube may be 'S'-shaped so that an area in which silicon tube contacts the outside may be increased, as illustrated in FIG. 2, and cooling efficiency may be improved. When the radiator 131 may be the silicon tube, lower costs are incurred than when an aluminum pipe is applied to the radiator 131, and a volume at which the radiator 131 is installed may be reduced, and the radiator 131 may be changed in various forms.

Peltier cooling modules 136a and 136b are attached to both sides of the radiator 131 to face each other, wherein the radiator 131 is placed between the Peltier cooling modules 136a and 136b. In this case, as compared to FIG. 2 in which the Peltier cooling module 136 of FIG. 2 is attached to one side of the radiator 132 of FIG. 2, the speed of cooling water that flows in the radiator 131 may be increased. However, the present invention is not limited thereto, and a plurality of the Peltier cooling module 136 of FIG. 2 and a plurality of the Peltier cooling modules 136a, and 136b of FIG. 3 may be attached to various positions of the radiator 131 of FIG. 3 and the radiator 132 of FIG. 2 according to the lengths of the radiators 131 and 132, the amount of water that flows in the radiator 131 or 132, costs or temperature at which the water 1 is to be cooled within a predetermined time.

Each of the Peltier cooling modules 136a and 136b is connected to the electric current controller 150, as illustrated in FIG. 2, and heat dissipating plates 134a and 134b may be disposed outside the Peltier cooling modules 136a and 136b. A detailed description thereof is substantially the same as the electric current controller 150 and the heat dissipating plate 134 of FIG. 2 and thus will not be provided here.

As described above, in the baby formula maker according to the present invention, the time required to make milk at which the water 1 is boiled and then is cooled to be at an appropriate temperature for nursing and then is mixed with the baby formula 2 may be remarkably reduced to 2 minutes. Thus, if milk for nursing is needed, nursing may be carried out within a short time, and speed and convenience may be provided to the user. Also, the water 1 is boiled and thus, sterilization and pasteurization effects are guaranteed so that nursing may be carried out safely. The baby formula maker includes the covers 111 and 161 which have a sealing function allowing them to be cleaned by dissembling certain elements of the baby formula maker. The baby formula tub 160 can be constructed from an antibacterial material and thus is sanitary and has a simple structure so that the baby formula maker may be manufactured with low costs on a mass scale and consumers may purchase a low-priced baby formula maker.

As described above, in the baby formula maker according to the present invention, the time required to make milk for nursing can be significantly reduced, and if milk for nursing is needed, immediate nursing can be carried out, and speed and convenience can be provided to the user, and the baby formula maker is sanitary and compact and has a simple structure and thus can be manufactured on a mass scale.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A baby formula maker comprising:
a main body in which a water tub and a baby formula tub are installed;
a heating portion installed in the main body capable of heating water contained in the water tub;
a time controller capable of controlling time at which water is heated by the heating portion;
a water outlet through which the water is discharged from the water tub;
a baby formula outlet through which baby formula is discharged from the baby formula tub; and
a cooling portion being disposed between the water tub and the water outlet, and cooling the water discharged from the water tub so that cooled water is discharged to the water outlet;
wherein the time controller is connected to an opening and closing portion disposed in the water tub, and if the water contained in the water tub is heated by the heating portion to reach a predetermined temperature, the time controller allows the opening and closing portion to open and allows the water to be supplied to the cooling portion.

2. The baby formula maker of claim 1, wherein the water tub is formed of stainless steel.

3. The baby formula maker of claim 1, wherein the baby formula tub includes a baby formula discharge switch capable of discharging a predetermined amount of the baby formula in response to a user's manipulation of the discharge switch.

4. The baby formula maker of claim 1, wherein at least one of the water tub and the baby formula tub is formed of a transparent material so that one of an amount of water that remains in the water tub and an amount of the baby formula that remains in the baby formula tub is viewable from the outside.

5. The baby formula maker of claim 1, wherein the heating portion is a nichrome heating coil.

6. The baby formula maker of claim 1, wherein the cooling portion comprising a radiator capable of cooling the water heated by the heating portion.

7. The baby formula maker of claim 6, wherein the cooling portion further comprising at least one Peltier cooling module attached to the radiator so as to lower temperature of the radiator.

8. The baby formula maker of claim 6, wherein the radiator is one of an aluminum pipe and a silicon tube.

9. The baby formula maker of claim 7, wherein the at least one Peltier cooling module has a heat dissipating plate disposed outside the at least one Peltier cooling module.

* * * * *